US012127162B2

(12) United States Patent
Sharma et al.

(10) Patent No.: US 12,127,162 B2
(45) Date of Patent: Oct. 22, 2024

(54) COMMUNICATIONS DEVICE, INFRASTRUCTURE EQUIPMENT AND METHODS CLASS

(71) Applicant: Sony Group Corporation, Tokyo (JP)

(72) Inventors: Vivek Sharma, Basingstoke (GB); Yassin Aden Awad, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 420 days.

(21) Appl. No.: 17/430,731

(22) PCT Filed: Jan. 16, 2020

(86) PCT No.: PCT/EP2020/050984
§ 371 (c)(1),
(2) Date: Aug. 13, 2021

(87) PCT Pub. No.: WO2020/169279
PCT Pub. Date: Aug. 27, 2020

(65) Prior Publication Data
US 2022/0141801 A1    May 5, 2022

(30) Foreign Application Priority Data

Feb. 22, 2019  (EP) ..................... 19158952

(51) Int. Cl.
H04W 68/02    (2009.01)
(52) U.S. Cl.
CPC .................. H04W 68/02 (2013.01)
(58) Field of Classification Search
CPC .... H04W 68/02; H04W 68/00; H04W 68/005
(Continued)

(56) References Cited

U.S. PATENT DOCUMENTS

2013/0094371 A1*  4/2013  Vallath ................. H04W 76/25
                                                  370/252
2013/0102311 A1    4/2013  Park
(Continued)

FOREIGN PATENT DOCUMENTS

CN    102469585 A    5/2012
CN    102625254 A    8/2012
(Continued)

OTHER PUBLICATIONS

International Search Report and Written Opinion mailed on Jun. 26, 2020, received for PCT Application PCT/EP2020/050984, Filed on Jan. 16, 2020, 17 pages.
(Continued)

Primary Examiner — Qutbuddin Ghulamali
(74) Attorney, Agent, or Firm — XSENSUS LLP

(57) ABSTRACT

A method of operating an infrastructure equipment of a wireless communications network, the method comprising transmitting control information via a wireless access interface provided by the wireless communications network to a communications device to configure the communications device to receive paging messages as part of a group of one or more communications devices, the communications device being configured by the control information from a first state in which the communications device monitors a pattern of paging frames of the wireless access interface for receiving paging messages determined by the communications device to a second state in which the communications device is configured to monitor the same pattern of paging frames of the wireless access interface for receiving paging messages as the group of one or more communications devices.

19 Claims, 6 Drawing Sheets

(58) Field of Classification Search
USPC .......................................................... 455/458
See application file for complete search history.

(56) References Cited

U.S. PATENT DOCUMENTS

| | | | |
|---|---|---|---|
| 2013/0136072 A1 | 5/2013 | Bachmann | |
| 2016/0007170 A1* | 1/2016 | Vaidya | H04W 4/12 370/312 |
| 2018/0176847 A1* | 6/2018 | Fasil Abdul | H04L 1/1896 |
| 2020/0229095 A1* | 7/2020 | Shrestha | H04W 68/00 |

FOREIGN PATENT DOCUMENTS

| | | |
|---|---|---|
| CN | 103444248 A | 12/2013 |
| CN | 103947135 A | 7/2014 |
| CN | 107027154 A | 8/2017 |
| GB | 2509071 A | 6/2014 |
| KR | 20180093169 A | 8/2018 |
| WO | WO-2014000336 A1 | 1/2014 |
| WO | 2019/033112 A1 | 2/2019 |

OTHER PUBLICATIONS

Holma et al., "LTE for UMTS OFDMA and SC-FDMA Based Radio Access", John Wiley & Sons, 2009, pp. 25-27.
Seth, "Basics of Algorithmic Trading: Concepts and Examples", Algorithmic Trading, Algorithmic/Automated Trading Basic Education, Investopedia, May 5, 2021, pp. 1-13.
Nokia et al., "Revised SID: Study on NR Industrial Internet of Things (IoT)", 3GPP TSG RAN meeting #81, RP-182090, Sep. 10-13, 2018, 5 pages.
3GPP, "NR; NR and NG-RAN Overall Description; Stage 2 (Release 15)", 3GPP TS 38.300 V15.3.1, Oct. 2018, pp. 1-92.
3GPP, "NR; User Equipment (UE) Procedures in Idle Mode and RRC Inactive State (Release 15)", 3GPP TS 38.304 V15.2.0, Dec. 2018, pp. 1-28.

* cited by examiner

COMMUNICATIONS DEVICE, INFRASTRUCTURE EQUIPMENT AND METHODS CLASS

CROSS-REFERENCE TO RELATED APPLICATIONS

The present application is based on PCT filing PCT/EP2020/050984, filed Jan. 16, 2020, which claims the priority of European patent application no. EP 19158952.2, filed Feb. 22, 2019, the contents of each are hereby incorporated by reference.

BACKGROUND

Field

The present disclosure relates to communications devices, infrastructure equipment and methods for the configuration of a communications device by an infrastructure equipment in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

Embodiments of the present technique can provide a method of operating an infrastructure equipment of a wireless communications network, the method comprising transmitting control information via a wireless access interface provided by the wireless communications network to a communications device to configure the communications device to receive paging messages as part of a group of one or more communications devices, the communications device being configured by the control information from a first state in which the communications device monitors a pattern of paging frames of the wireless access interface for receiving paging messages determined by the communications device to a second state in which the communications device is configured to monitor the same pattern of paging frames of the wireless access interface for receiving paging messages as the group of one or more communications devices.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
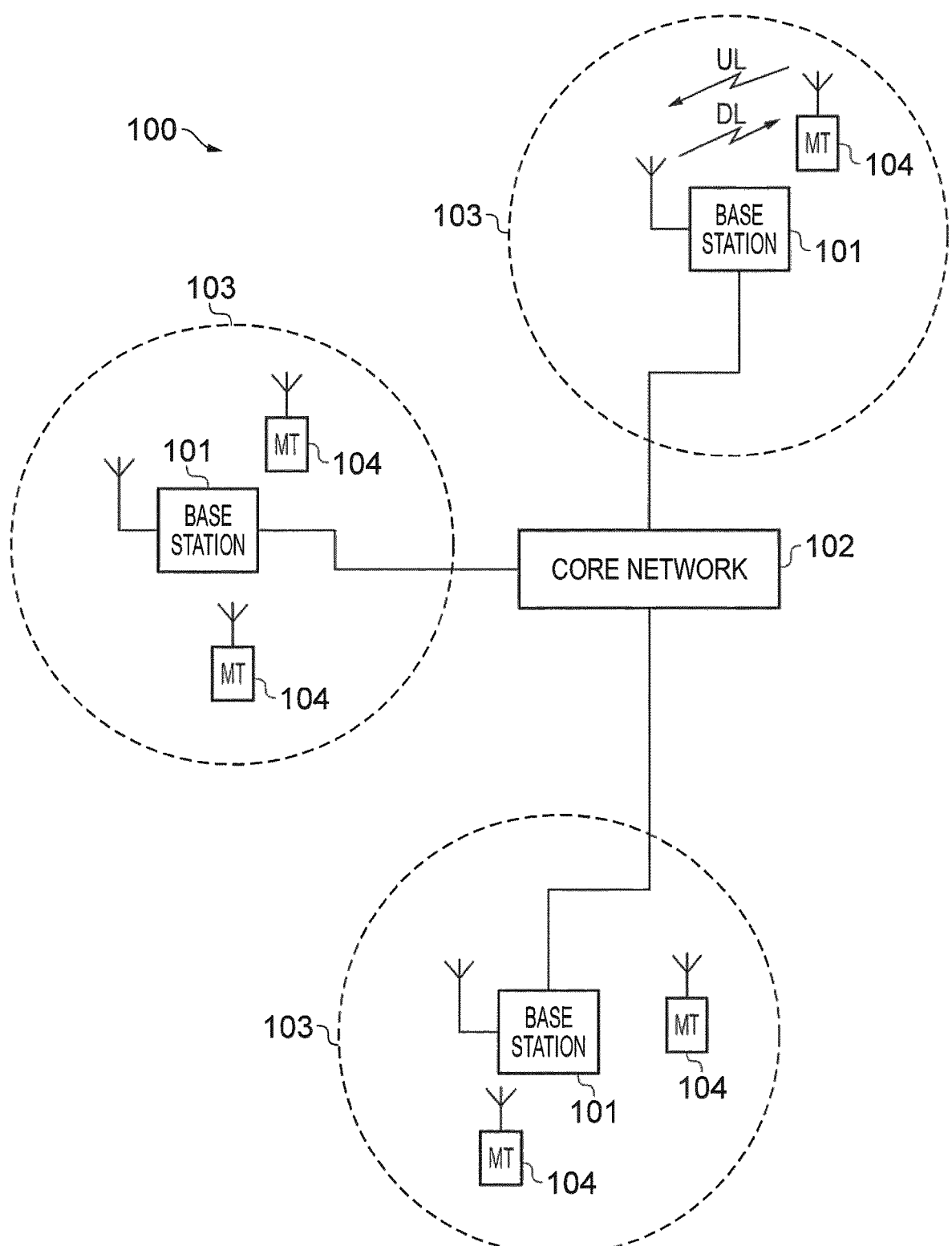
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.
New Radio Access Technology (5G)

Figure 2:
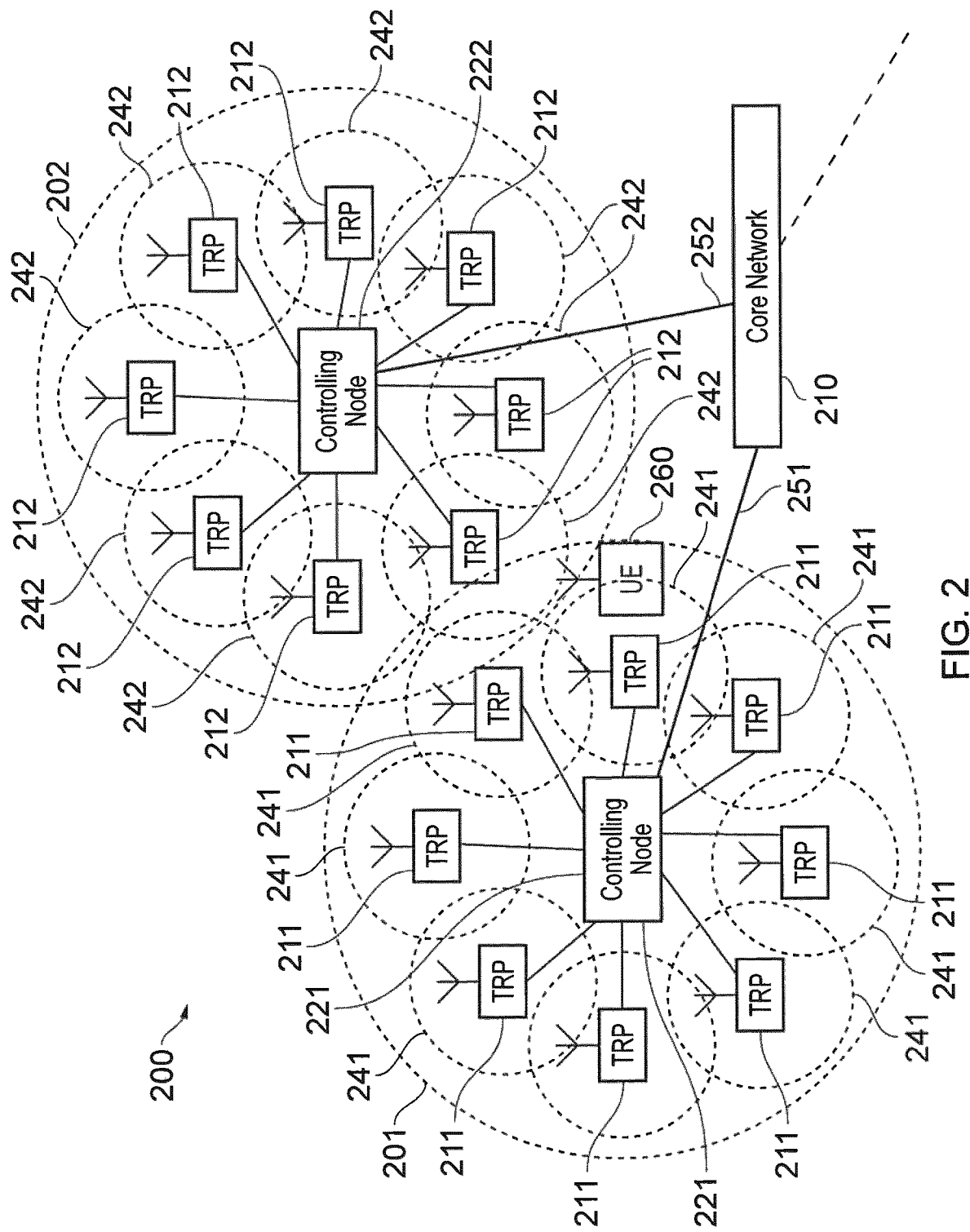
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

A better appreciation provided by the example embodiments can be gained from reviewing a proposed wireless access interface according to 3GPP LTE/4G and NR/5G. However it will be appreciated that the wireless access interface provides physical communications resources including shared channels for both uplink and the downlink which may be accessed by communicating appropriate control signalling as those acquainted with LTE will appreciate.

Figure 3:
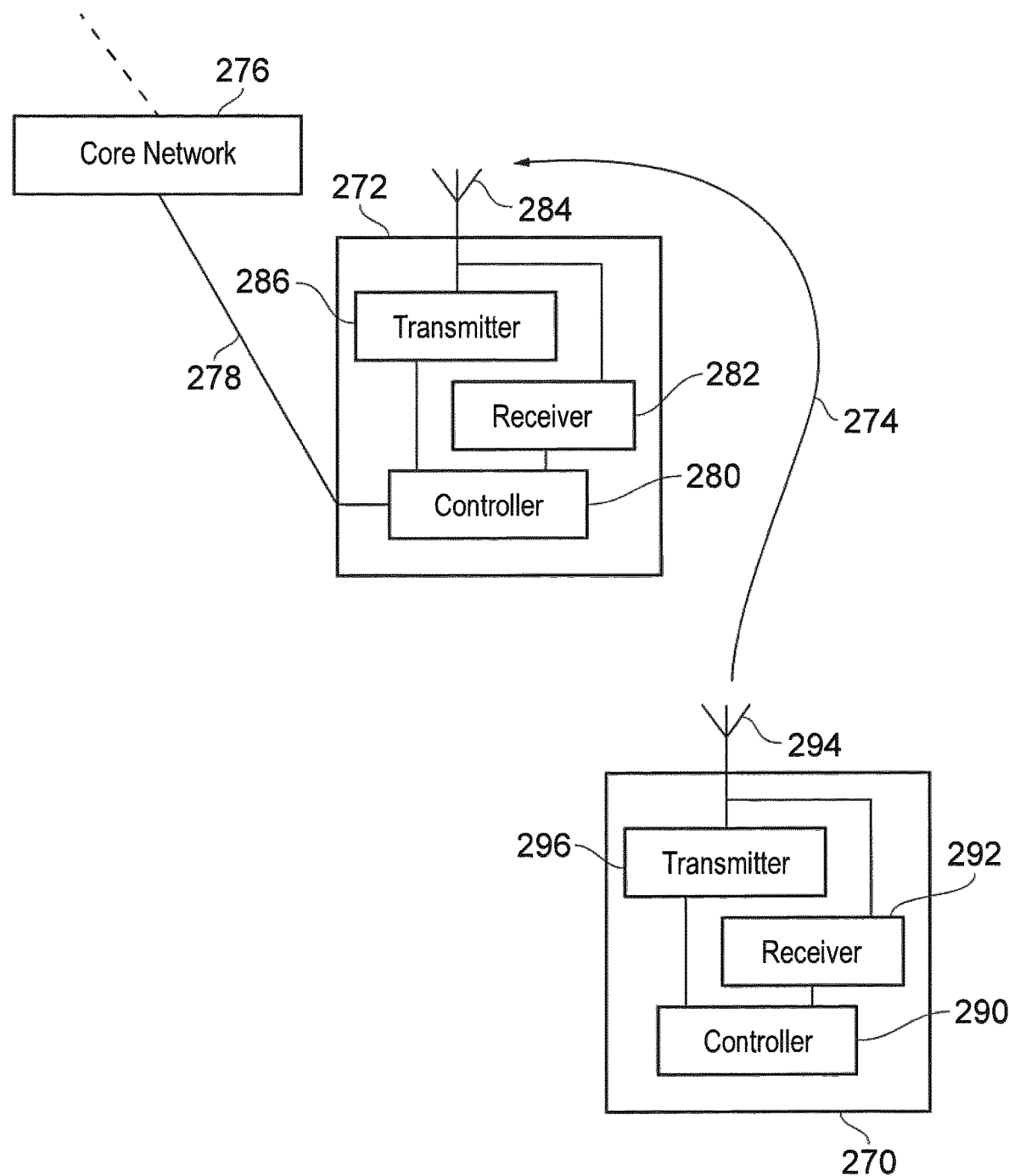
FIG. 3 is a schematic block diagram of an example infrastructure equipment and communications device which may be configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via grant free resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [6] services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN).

In order to permit a communications device to transmit data associated with multiple traffic classes in a timely manner, multiple configured grants/semi-persistent scheduling (SPS) grants may be required in order to provide more flexibility while avoiding excessive dynamic downlink control signalling.

One of the aspects of URLLC being developed for 5G/NR to support IIoT is a requirement for URLLC to provide a low latency, measured from the ingress of a layer 2 packet to its egress from the network, with a proposed target of 1 ms with a reliability of 99.999%, and later it has been extended to 0.5 ms with a reliability of 99,9999%. This is required in order to support the services for IIoT which require high availability, high reliability, low latency, and in some cases, high-accuracy positioning [1]. Furthermore, one of the requirements for communicating uplink data from a UE is to manage intra-UE packet prioritization and multiplexing. This is a requirement to prioritise the communication of uplink data and control packets from different categories of traffic within the UE. A better appreciation of the generation of uplink data of different logical types will be provided in the following section.

Paging Frames

Paging permits the transmission downlink data without requiring each communications device 104 to continuously monitor downlink data channels (such as physical downlink shared channels, PDSCHs).

Instead, each communications device 104 determines a sequence of time windows, which may be referred as paging frames, during which it monitors a subset of communications resources, such as a paging channel. The sequence of time windows or paging frames for each communications device 104 is also known to the infrastructure equipment 101.

In some examples, paging frames may occur in subframes having subframe number SFN, where equation (1) is satisfied:

$$(SFN+PF\_\text{offset}) \bmod T = (T \text{ div } N)*(UE\_ID \bmod N) \quad (1)$$

where UE_ID is an identifier of the communications device 104, such as a temporary mobile subscriber identity (TMSI), which may be a 5G-S-TMSI, SFN is a subframe number, N is a number of paging groups, and T and PF_offset are parameters configured (that is, indicated in transmitted control messages) by the network.

When the infrastructure equipment 101 determines that it has downlink data to transmit to the communications device 104, it determines the next paging frame when the communications device 104 will monitor the paging channel.

The infrastructure equipment 101 may determine that it has downlink data to transmit in response to receiving the downlink data from the core network 102, or based on a generation of data by the infrastructure equipment 101 for transmission to the communications device 104.

During the next paging frame, it transmits a paging message to the communications device 104. The paging message comprises an indication of an identity of the communications device 104 and an indication that the infrastructure equipment 101 has downlink data for transmission to the communications device 104.

In response to receiving the paging message, the communications device 104 transmits a response message to the infrastructure equipment 104. Subsequently, the communications device 104 monitors communications resources on which the infrastructure equipment 101 transmits the downlink data.

It will be appreciated that intermediate steps for, for example, establishing or resuming an RRC connection by means of a random access procedure may occur between the transmission of the paging message and the transmission of the data. The response message may be transmitted on a random access channel, such as on a physical random access channel (PRACH).

Different communications devices may be configured with different sets of paging frames, in order to avoid congestion on the paging channel and on the PRACH.

It may be that, in accordance with conventional techniques, two or more communications devices select a same instance of the PRACH to transmit a random access request. The random access requests may be in response to paging or in response to a determination by the communications device that it has uplink data to transmit.

In order to increase the probability of a successful random access procedure, the random access request may comprise an element, such as a random access preamble, randomly selected by the communications device. Each communications devices selects, at random and independently of the random selection by the other communications device(s), from a number of predetermined RACH preambles. Thus, even if two communications devices transmit on a same PRACH instance, their random access requests may still be decoded by the infrastructure equipment if they comprise different preambles.

Nevertheless, there remains a possibility that both communications devices select the same preamble for transmission on the same PRACH instance. In such circumstances, it is highly likely that one or both random access attempts will fail.

Figure 4:
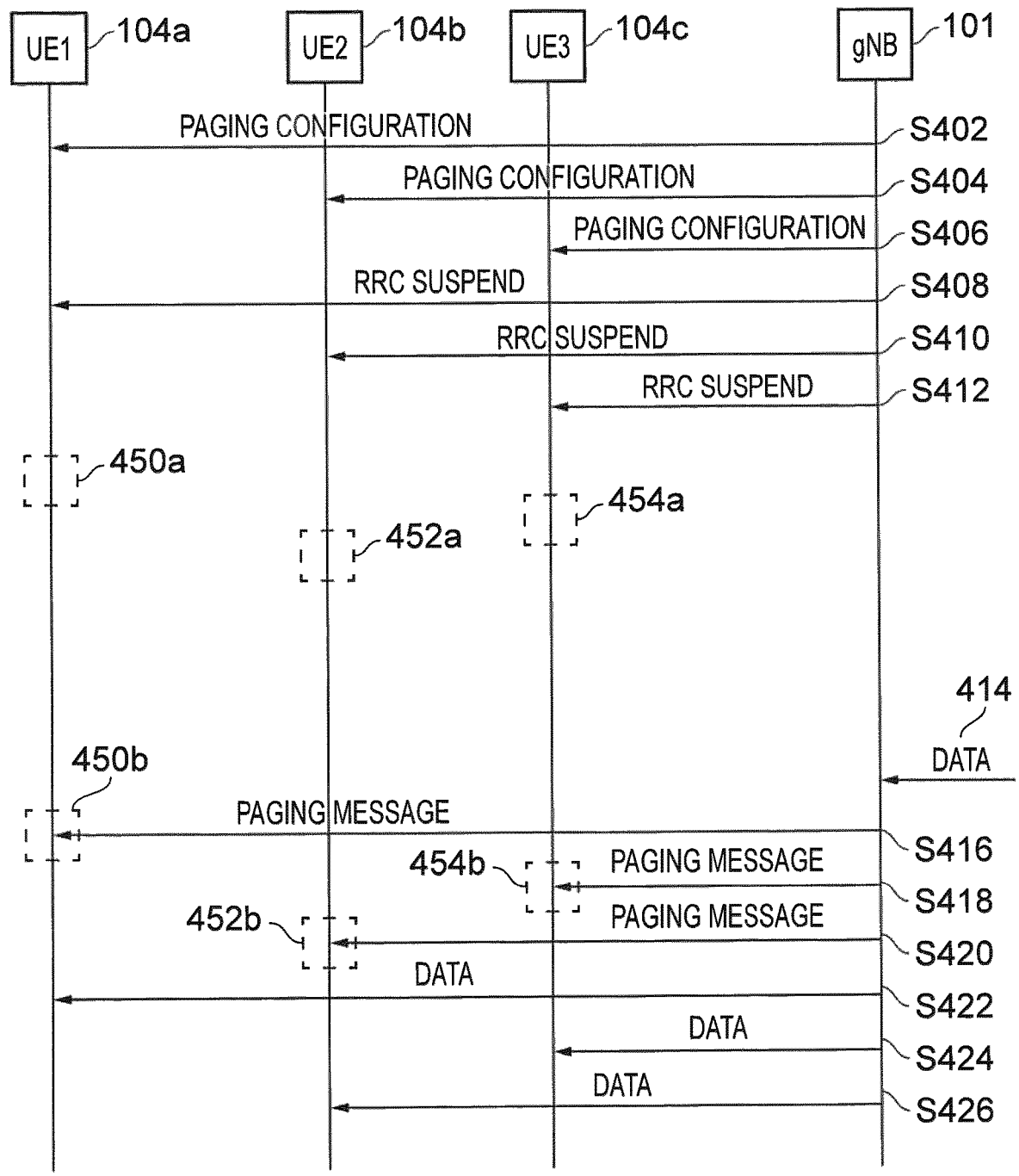
FIG. 4 illustrates a message sequence chart for the transmission of downlink data to multiple communications devices, in accordance with conventional techniques for transmitting downlink data.

FIG. 4 illustrates a message sequence chart for the transmission of downlink data to multiple communications devices, in accordance with conventional techniques for transmitting downlink data.

It will be appreciated that certain steps and messages have been omitted or conflated for conciseness.

FIG. 4 shows three communications devices, UE1 104a, UE2 104b and UE3 104c, and an infrastructure equipment, such as a gNB 101.

At steps S402, S404 and S406 respectively, the gNB 101 configures each of UE1 104a, 104b and 104c with a paging configuration. The paging configuration permits the communications devices to determine their subsequent paging frames. In the example of FIG. 4, the paging configuration may be carried out while the communications devices are in an RRC connected mode, although the establishment of the RRC connections is not shown for conciseness.

The paging configuration may comprise an indication of a temporary identifier, such as a TMSI, based on which each UE or communications device (and similarly, the infrastructure equipment 101) is able to determine subsequent paging frames, for example, based on a modulo operation on the TMSI value. The TMSI value and corresponding DRX cycle for monitoring the downlink paging channel may be allocated by the core network; this step is omitted from FIG. 4 for conciseness.

Subsequently, at steps S408, S410 and S412, the infrastructure equipment 101 transmits an RRC suspend message to each of the communications device 104a, 104b, 104c, having the effect that the RRC connection for each communications device is suspended. The communications devices may thus enter the RRC INACTIVE state from the RRC CONNECTED state. In the RRC INACTIVE state, state associated with the RRC connection is maintained at the communications devices and the infrastructure equipment. The respective RRC connections are not active and the communications devices monitor a paging channel during respective paging frames in accordance with the configuration at steps S402, S404 and S406 to determine if the infrastructure equipment has downlink data for transmission to it. Uplink data cannot be transmitted during the RRC INACTIVE state.

In general, the RRC INACTIVE state may reduce the requirements on the communications device to monitor downlink communications resources, so that its power consumption is reduced, compared with when in the RRC CONNECTED mode.

Thus, the communications devices 104a, 104b, 104c enter a state in which monitoring requirements are reduced and/or power consumption may be reduced, relative to an active state. In some embodiments, the new state is the RRC INACTIVE state.

Subsequently, the communications devices 104a, 104b, 104c monitor the paging channel during their respective paging frames. In the example of FIG. 4, the paging frames (shown by dashed rectangles 450, 452, 454) for the three communications devices do not overlap.

At step S414, the infrastructure equipment 101 receives downlink data for transmission to the three communications devices 104a, 104b, 104c. In response, it determines the next instance 450b of the paging frames 450 for paging the first communications device 104a, and similarly determines instances 452b and 454b for paging the second and third communications device 104b, 104c.

During the determined paging frames 450b, 452b, 454b, the infrastructure equipment 101 transmits paging messages to the first, second and third communications devices 104a, 104b, 104c at steps S416, S420 and S418, respectively.

Accordingly, (and with intervening steps and messages not shown) at steps S422, S426 and S424, the infrastructure equipment transmits the downlink data to the first, second and third communications devices 104a, 104b, 104c, respectively.

There remains, however, a need to provide low latency delivery of data from an infrastructure equipment to one or more communications devices which are in a reduced power mode, such as the RRC INACTIVE state.

In one application a group of UEs are operating as part of a financial service such as a trading floor and require rapid paging to receive contemporaneously the latest financial information. As such there is a desire for each of the UEs which are configured with a conventional pattern of paging frames which are determined by the UE using the above technique to be re-configured when the UEs are on the trading floor to monitor the same pattern of trading feeds so that a gNB providing a cell serving the trading floor can page all the UEs in the group and therefore transfer down link data more rapidly compared with going to each of the UEs separately as would be the case for a conventional operation in which the UEs determined their paging frames.

Figure 5:
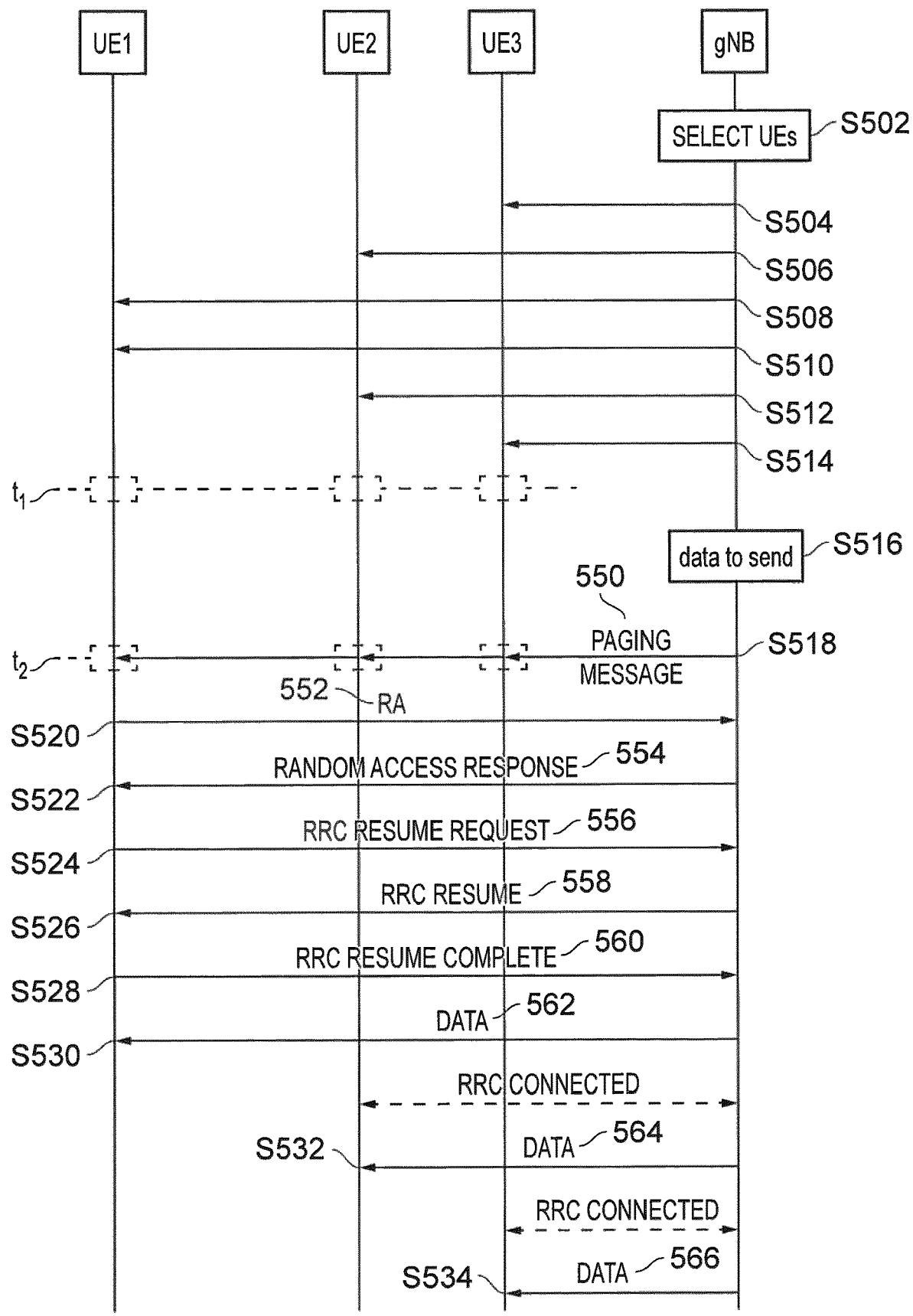
FIG. 5 illustrates a message sequence chart showing the transmission of downlink data in accordance with embodiments of the present technique.

Accordingly, the present disclosure provides a method of operating an infrastructure equipment of a wireless communications network, the method comprising transmitting control information via a wireless access interface provided by the wireless communications network to a communications device to configure the communications device to receive paging messages as part of a group of one or more communications devices, the communications device being configured by the control information from a first state in which the communications device monitors a pattern of paging frames of the wireless access interface for receiving paging messages determined by the communications device to a second state in which the communications device is configured to monitor the same pattern of paging frames of the wireless access interface for receiving paging messages as the group of one or more communications devices. FIG. 5 illustrates a message sequence chart showing the transmission of downlink data in accordance with embodiments of the present technique.

The process starts at step S502 with a selection of a group of a plurality of communications devices to receive fast downlink data transmissions. The group of communications devices may be selected according to an associated network slice or subscription parameters (for example, that they all subscribe to a certain service, or are associated with a certain commercial entity). For example, the communications devices may be selected based on their being associated with a subscription for low latency financial information. The financial information may comprise stock exchange prices, or foreign exchange rates, trading information and/or any other similar information.

In some embodiments, location determination is based on measurements of an indoor beacon, device-to-device proximity detection in respect of one or more additional communications devices, and/or radio resource management (RRM) measurements.

In some embodiments, the communications device may be selected as a group member based on an application associated with (e.g. running on) the communications device.

In some embodiments, the criteria for inclusion in the group may be pre-determined and known to the communications devices. In some embodiments, the criteria are pre-determined at the infrastructure equipment 101 and not at the communications devices.

In the example of FIG. 5, first, second and third communications device 104a, 104b and 104c are selected at step S502.

In some embodiments, step S502 and the subsequent configuration steps described below may occur multiple times, such as in response to determining that a communications device 104 has newly satisfied the requirements for selection. For example, the infrastructure equipment may determine that a communications device 104 has moved to be within a pre-determined area, such as within a coverage area of the cell 103 controlled by the infrastructure equipment 101. The cell 103 may correspond, for example, to a trading floor of a stock exchange. In response, the infrastructure equipment 101 may perform step S502 and subsequent configuration steps as described below.

At steps S504, S506 and S508 respectively, each of the selected communications devices 104a, 104b, 104c are configured with a same, synchronised, sequence of paging frames by the infrastructure equipment 101.

In some embodiments, the configuration of the synchronised paging frames comprises transmitting to each of the selected communications devices an indication of a value to use in the determination of paging frames, in place of a temporary identifier, such that the paging frames, when determined using each of the values, are the same (i.e. synchronised with respect to each other).

In some embodiments, each value is different; in some embodiments, the same value is used, and in some such embodiments, the value is zero.

For example, in some embodiments, at each of step S504, S506 and S508, the infrastructure equipment 101 transmits a paging configuration message indicating that the value 0 (zero) is to be used in place of the 5G-S-TMSI (i.e. as the value UE_ID) in determining the paging frames for each of the selected communications devices 104a, 104b, 104c.

In some embodiments, the value is a predetermined value to be used when no temporary identifier has been assigned.

In some embodiments, the configuration of the same paging frames is by assigning each of the selected communications devices with a temporary identifier to use in the determination of paging frames such that the paging frames, when determined using each of the values (for example, in accordance with conventional techniques and/or using equation (1) above), are the same.

In some embodiments, the configuration of the same paging frames is by assigning each of the selected communications devices with a parameter UE_ID_MOD_N to use in the equation (1) in place of the expression (UE_ID mod N). Thus, paging frames are determined according to equation (2):

$$(SFN+PF\_\text{offset}) \bmod T = (T \bmod N) * (UE\_ID\_MOD\_N) \quad (2)$$

In the example of FIG. 5, at each of steps S510, S512 and S514, an RRC connection associated with a respective one of the communications device 104a, 104b and 104c are suspended and the communications devices enter the RRC INACTIVE state.

In some embodiments, the RRC connections are terminated or released, and the new state is the RRC IDLE state. In the RRC IDLE state, no state associated with the (most recent) RRC connection of the communications device is maintained at the infrastructure equipment.

In any case, while no longer in the RRC CONNECTED state, the communications devices 104a, 104b, 104c monitor the downlink paging channel in synchronised paging frames determined in accordance with the configuration at steps S504, S506, S508 described above. All of the selected communications devices 104 which are not in the RRC CONNECTED state monitor the paging channel at the same paging frames. In the example of FIG. 5, these are shown by dashed rectangles at times t1 and t2.

At step S516, the infrastructure equipment 101 determines that it has (or will soon receive or generate) downlink data to transmit to each of the communications devices 104a, 104b, 104c in the group. In some embodiments, the same downlink data is to be transmitted to each of the communications devices. In some embodiments, different downlink data is to be transmitted to each of the communications devices.

In the example of FIG. 5, the determination at step S516 is based on receiving, while the communications devices are in the RRC INACTIVE state, downlink data from the core network 102.

In some embodiments, the determination is based on generating at the infrastructure equipment 101, downlink data for transmission to the communications devices.

In some embodiments, the determination is based on receiving by the infrastructure equipment 101 a paging message from the core network 102. In some such embodiments, the communications devices 104a, 104b, 104c may be in the RRC IDLE state.

In response to the determination at step S516, the infrastructure equipment 101 determines that the next synchronised paging frame to be monitored by the communications devices 104a, 104b, 104c is at time t2. As a result of the paging configuration at steps S504, S506, S508, the next synchronised paging frame to be monitored by one of the selected communications devices at time t2 will also be monitored by the other selected communications devices.

At step S518, the infrastructure equipment 101 transmits in the determined next paging frame a paging message 550. The paging message 550 comprises an indication that downlink data is to be transmitted to each of the communications devices 104a, 104b, 104c.

After receiving the paging message 550, each of the communications devices 104a, 104b, 104c enters the RRC CONNECTED state and receives, at steps S530, S532, and S534, the downlink data 562, 564, 566, respectively.

In some embodiments, the transition from RRC INACTIVE or RRC IDLE to RRC CONNECTED in response to receiving the paging message 550 is automatic, and the communications device enters the RRC CONNECTED mode without additional transmissions.

In some embodiments, each communications device responds to the paging message 550 by transmitting one or more messages before receiving the data, for example in a conventional manner. In some embodiments, in response to receiving the paging message 550, a communications device transmits a random access message on the PRACH to initiate a random access procedure. The random access procedure results in the establishment or resumption of an RRC connection, and the subsequent reception of the downlink data.

In some embodiments, one or more of the selected communications devices performs a random access procedure prior to receiving the downlink data, and one or more of the selected communications devices enters the RRC CONNECTED state automatically. In some such embodiments, the infrastructure equipment 101 may transmit (for example, as part of the configuration steps S504, S506, S508) a random access permission indication to each of the selected communications devices to indicate that one of the following applies to the communications device:

the communications device is required to initiate a random access procedure in response to a paging message transmitted during a synchronised paging frame;

the communications device is prohibited from initiating a random access procedure in response to a paging message transmitted during a synchronised paging frame, and shall enter the RRC CONNECTED mode automatically.

In some embodiments, where the random access permission indication indicates that the communications device is required to initiate a random access procedure, the random access permission indication may further indicate that the communications device is to perform a 4-step RACH or a 2-step RACH procedure.

In response to the indication and the reception of a paging message transmitted during a synchronised paging frame, each communications device may proceed in accordance with the configuration.

In some embodiments, the infrastructure equipment 101 configures exactly one of the selected communications devices to be required to initiate a random access procedure in response to a paging message transmitted during a synchronised paging frame.

In the example of FIG. 5, the first communications device 104a responds to the paging message 550 by initiating a 4-step RACH procedure by transmitting, at step S520, a random access message 552 on the PRACH. In response to receiving the random access message 552, the infrastructure equipment 101 transmits a random access response 554 at step S522.

At step S524, in response to receiving the random access response 554, the communications device 104a transmits a 'message 3', such as an RRC Resume request message 556. At step S526, the infrastructure equipment 101 transmits an RRC Resume message 558 in response to receiving the RRC Resume request message 556.

At step S528, in response to receiving the RRC Resume message 558, the communications device 104a transmits an RRC Resume Complete message 560. The communications device 104a enters RRC CONNECTED state.

The first communications device 104a therefore receives the data 562 in step S530.

In the example of FIG. 5, the second and third communications devices 104b, 104c are configured to enter the RRC CONNECTED state without completing a random access procedure. Thus, as indicated by the dashed double-headed arrows, they enter the RRC CONNECTED state and, at steps S532 and S534, receive the data 564, 566 without completing a random access procedure. Details of this step are provided below.

For the purposes of clarity, steps are shown sequentially in FIG. 5; however, this may not be the case in some embodiments. In particular, the second and third communications devices 104b, 104c may enter the RRC CONNECTED mode directly in response to receiving the paging message 550, and may thus receive the data 564, 566 earlier than is shown in the sequence of FIG. 5. For example, they may receive the data prior to the completion of the random access procedure of the first communications device 104a.

It should also be readily apparent that while the sequence chart of FIG. 5 broadly illustrates the sequence of messages and actions as time progresses from top to bottom, as with all message sequence charts for the present application, the (vertical) time axis is not to scale.

The process of FIG. 5 may be repeated for different selected groups of communications devices. In some embodiments, the steps of the process of FIG. 5 may be repeated in respect of a given communications device, whereby different synchronised paging frames may be configured for different selected groups to which the communications device belongs, or for different traffic types (for example, for downlink data having different quality of service requirements, or associated with different services).

As described above, in some embodiments, one or more of the communications devices 104a, 104b, 104c may enter the RRC CONNECTED state directly in response to receiving the paging message 550.

In some embodiments, one or more of the communications devices 104a, 104b, 104c may have been in a first state in which they were configured with paging frames which are not synchronised with those of the other selected communications devices. This may be, for example, prior to step S502. In some such embodiments, the non-synchronised paging frames may have been configured in accordance with conventional techniques, such as those illustrated in FIG. 4 and described above, for example, based on the assigned 5G-S-TMSI, when the 5G-S-TMSI is assigned in a manner which does not ensure synchronised paging frames for the selected communications devices.

In response to receiving the configuration at steps S504, S506, S508, the communications devices may enter a second state in which the synchronised paging frames are configured.

In some embodiments, a communications device may be configured only in the second state by means of one of the steps S504, S506, S508 if, for example, on initial connection to the wireless communications network (such as after being switched on or reset) it is determined to satisfy the criteria for being configured in the second state.

In some embodiments, the synchronised paging frames are used for all paging message for the communications devices and as such, replace any non-synchronised paging frames. Therefore, in the second state, the communications device 104 may monitor only synchronised paging frames.

In some embodiments, the synchronised paging frames are configured in addition to non-synchronised paging frames. In the second state, the communications device 104 may monitor synchronised paging frames and non-synchronised paging frames. The infrastructure equipment 101 may determine, in such embodiments, whether to page the communications devices within the selected group using a synchronised paging frame, or a non-synchronised paging frame. This determination may be based on a latency requirement associated with the downlink data (so that, downlink data having a maximum permitted latency below a predetermined threshold is notified using a synchronised paging frame). Additionally or alternatively, the determination may be based on whether application data is to be transmitted only to a single communications device, or to all communications devices within the selected group. Where the data is to be transmitted to all communications devices within the selected group, then the infrastructure equipment may use a next synchronised paging frame. This may ensure that the data is transmitted with improved (i.e. lower) latency and/or making more efficient use of the communications resources of the wireless access interface to all communications devices, collectively, compared with using conventional paging techniques for each communications device.

In the example shown in FIG. 5, the configuration of the synchronised paging frames is carried out separately from the suspension of the RRC connections. However, in some embodiments, these steps may be combined. That is, for example, at step S514 in which the infrastructure equipment 101 transmits to the first communications device 104a a message indicating that the RRC connection is to be suspended or released, the same message may also comprise an indication of the synchronised paging frames, such as an indication of the temporary identifier as described above.

Thus, in some embodiments, steps S504 and S514 may be combined, steps S506 and S512 may be combined and/or steps S508 and S510 may be combined. As part of one or more of the configuration steps S504, S506, S508, the infrastructure equipment 101 may, in addition, indicate to the respective communications device 104 whether, in response to subsequently receiving a paging message, one or both of a random access (RACH) procedure and/or an RRC Resume/RRC establishment procedure are to be skipped prior to the RRC connection being established or resumed.

In some embodiments, the selected plurality of communications devices may comprise all communications devices currently having the same serving cell. For example, in some embodiments, access to a particular cell may be restricted a priori to communications devices within the selected group, for example, based on an associated subscription. For example, the infrastructure equipment 101 may be provided for the exclusive use of employees at a particular company, or participants in a particular activity at a particular location (for example, traders at a stock market). Each communications device associated with such employees or participants may be associated with a subscription (known to the wireless communications network) permitting the communications device to access a cell provided by the infrastructure equipment 101.

In some embodiments, the configuration of the synchronised paging frames may be by means of a broadcast transmission by the infrastructure equipment 101. The broadcast transmission may indicate a UE_ID value for use in a conventional paging frame calculation technique, such as in accordance with equation (1) above. The broadcast transmission may be a system information message transmitted on a broadcast channel.

In some embodiments, at steps S504, S506, and S508, the infrastructure equipment 101 may additionally or alternatively indicate whether the respective communications device 104a, 104b, 104c is to monitor the synchronised paging frames, paging frames determined in a conventional manner, or both.

The infrastructure equipment 101 may subsequently transmit paging messages to a communications device in one or more paging frames which the respective communications device has been indicated to monitor in step S504, S506 or S508.

In some embodiments of the present technique, a communications device (such as one of the communications devices 104a, 104b, 104c) may transmit a synchronised paging capability indication to the infrastructure equipment that indicates that the communications device is capable of being configured to monitor synchronised paging frames. For example, the synchronised paging capability may indicate that the communications device will, in response to the configuration described at steps S504, S506 or S508 above, monitor the synchronised paging frames at t1 and t2, as described above. In addition, the communications device 104 may also indicate its capability to skip the RACH procedure and/or the RRC Resume/Establishment procedure in response to receiving the paging message.

In the example of FIG. 5, all of the selected group of communications devices 104 are in the RRC INACTIVE state when the infrastructure equipment 101 determines that there is downlink data to send at step S516. In some embodiments, the infrastructure equipment 101 may determine for which of the selected group of communications devices 104 there is data to be transmitted, and of those, which state each is in.

For example, in another example, the selected group of communications devices may comprise the three communications devices 104a, 104b, 104c as well as one or more additional communications devices. When the determination at step S516 is made, the infrastructure equipment may determine that each of the additional communications devices are either in the RRC CONNECTED state (in which case the data may be transmitted using conventional techniques for downlink data transmission during RRC CONNECTED state), or there may be no data to be transmitted to that communications device. The infrastructure equipment 101 may transmit the data to the three communications devices illustrated in FIG. 5 as described above.

In some embodiments, the infrastructure equipment may treat communications devices in the RRC IDLE mode in the same manner as communications devices in the RRC INACTIVE state. In some embodiments, the infrastructure equipment may transmit separate paging message to communications devices in the RRC IDLE state and to communications devices in RRC INACTIVE state.

In some embodiments, the same data may be for transmission to all communications devices in the selected group, in which case the determination may be made only in respect of the RRC state of each device in the group.

Figure 6:
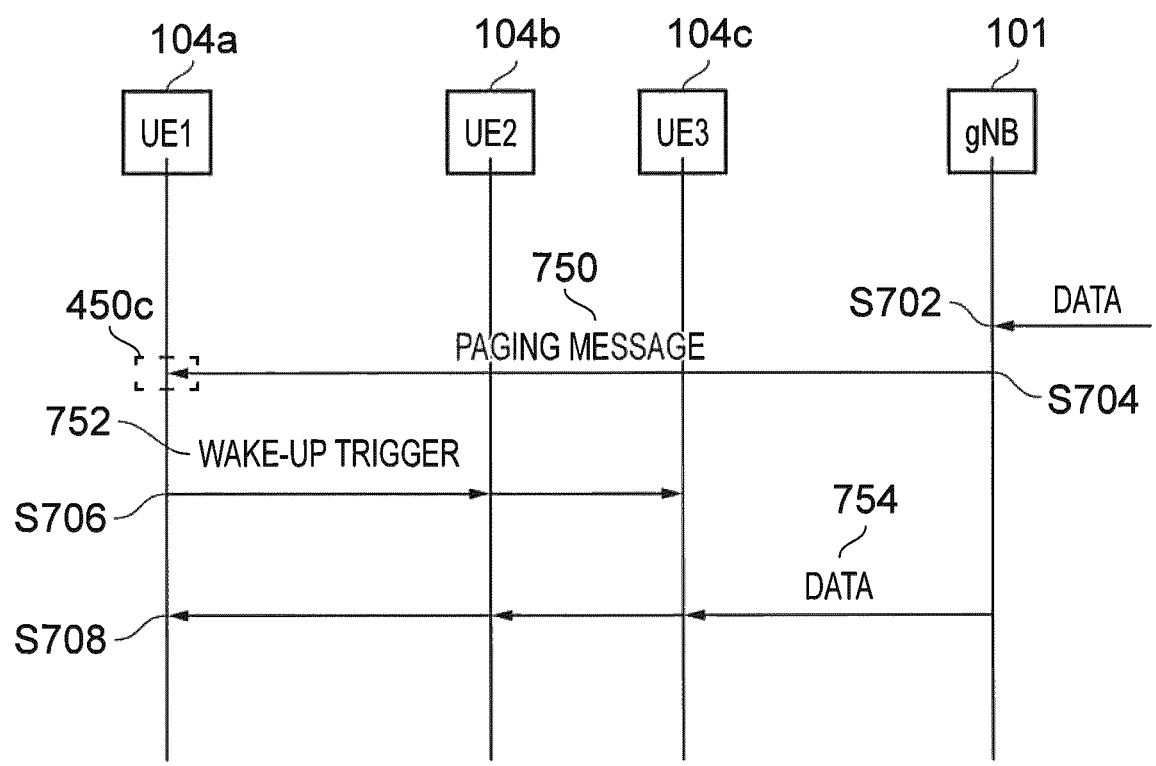
FIG. 6 is a message sequence chart showing a transmission of downlink data in accordance with embodiments of the present technique.

FIG. 6 is a message sequence chart showing a transmission of downlink data in accordance with embodiments of the present technique.

At the start of the sequence shown in FIG. 6, none of the three communications devices 104a, 104b, 104c are in the RRC CONNECTED state. For example, all three may be in the RRC INACTIVE state or in the RRC IDLE state. In some embodiments, some or all of the steps S502 to S514 as shown in FIG. 5 and described above may have occurred prior to the sequence shown in FIG. 5.

In addition, at least the second and third communications devices 104b, 104c are configured to monitor via a receiver for a wake-up trigger message, which may be transmitted by another communications device.

The configuration may comprise determining a nature (e.g. modulation scheme, message contents, encoding) of the wake-up trigger message, and means for its transmission (e.g. carrier frequency, schedule of possible time(s) of transmission).

In some embodiments, the periodicity of potential times of transmission of the wake-up trigger message is smaller than that of the non-synchronised paging frame occurrences monitored by the second and/or third communications devices 104b, 104c.

Alternatively, in some embodiments, the potential times of transmission of the wake-up trigger are aperiodic. In some embodiments, the wake-up trigger message is transmitted by the communications device 104a multiple times in response to a trigger event (e.g. the receipt of the paging message 750). The multiple transmissions may be in accordance with a predetermined rule known to both the first communications device 104a and the other communications devices 104b, 104c.

Similarly, at least the first communications device 104a is configured with (i.e. determines) the nature and means for transmission for the wake-up trigger message.

In some embodiments, the configuration is by means of the transmission by the infrastructure equipment 101 and receipt by the communications device 104 of a configuration message, such as the messages transmitted in step S504-S508 described above.

In the example of FIG. 6, at least the first communications device 104a is monitoring paging frames which are not synchronised with those of the other communications devices 104b, 104c. For example, the paging frame occurrence 450c may be determined based on an assigned TMSI, as described above in the example of FIG. 4. In some embodiments, as described above, the monitoring of the non-synchronised paging frames may be in addition to the monitoring of the synchronised paging frames.

In some embodiments, steps S504-S508 are omitted, such that each communications device 104 is configured to monitor only non-synchronised paging frames, for example in accordance with conventional techniques.

In the example of FIG. 6, at step S702, the infrastructure equipment receives data from the core network 102 (not shown) for transmission to the three communications devices 104a, 104b, 104c. It will be appreciated, as described above, that the downlink data may also be generated by the infrastructure equipment 101.

In response to the determination at step S702 that there is downlink data to be transmitted, the infrastructure equipment 101 determines the next paging frame to be monitored by any of the communications devices 104a, 104b, 104c. In the example of FIG. 6, this is determined to be the paging frame occurrence 450c being monitored by the first communications device 104a.

In response to this determination, at step S704, the infrastructure equipment 101 transmits a paging message 750 to the first communications device 104a, such that it is received within the paging frame occurrence 450c.

The paging message 750 comprises an indication that the infrastructure equipment 101 has downlink data to be transmitted to each of the three communications devices 104a, 104b, 104c. Alternatively, in some embodiments, the paging message 750 may indicate simply that the infrastructure equipment 101 has downlink data to be transmitted to at least one communications device in addition to the first communications device 104a.

In response to receiving the paging message 750, the first communications devices 104a transmits, at step S706, a wake-up trigger message 752. This is received by the second and third communications devices 104b, 104c.

In response to receiving the wake-up trigger message 752, the second and third communications devices 104b, 104c leave the RRC INACTIVE state. The second and third communications devices 104b, 104c may perform either a procedure, comprising a random access (RA) procedure, to resume or establish an RRC connection;

an RRC Resume/Establishment procedure without performing a random access procedure, as will be described below, or neither of the above.

The second and third communications devices 104b, 104c may then monitor a downlink channel for a transmission of data by the infrastructure equipment 101. The infrastructure equipment 101 may decide to omit the random access procedure if, for example, time alignment does not change compared to previous RA procedure. This may be because, for example, one or both of the communications devices 104b, 104c are stationary. The infrastructure equipment 101 may configure one or both of the communications devices 104b, 104c to skip an RRC Resume procedure if infrastructure equipment 101 determines that there is no security risk associated with such a modified procedure for this UE and authentication token/new key generation is not required.

Subsequently, at step S708, the infrastructure equipment 101 transmits the data 754 to the first, second and third communications devices 104a, 104b, 104c.

In the example of FIG. 6, no additional transmissions occur to or by the communications devices between the transmission of the wake-up trigger message 752 and the transmission of the data 754. In some embodiments, however, each of the communications devices may carry out a procedure to request the resumption or establishment of an RRC connection with the infrastructure equipment 101, for example by means of a 4-step or 2-step RACH procedure.

In the example of FIG. 6, a single transmission is made at step S708 of the data 754.

In some embodiments, the data 754 is transmitted in one or more separate messages, each to one or more of the communications devices.

In some embodiments, in response to a paging message, a communications device 104 performs a random access procedure in order to request establishment or resumption of an RRC connection, for example as illustrated in steps S520 to S528 of FIG. 5, and described above.

One use of a RACH procedure is to determine a timing advance for uplink transmissions by the communications device. In some embodiments, the communications devices 104 determines that a timing advance determined while the RRC connection was active (i.e. not suspended) is still valid, based on a determination that a distance moved by the communications device 104 since the timing advance was previously determined to be valid is less than a predetermined threshold.

In some embodiments, in response to determining that the previous timing advance is still valid, then, in response to a paging message, a communications device 104 performs an uplink transmission using the previous timing advance. The uplink transmission may be on communications resources of an uplink shared channel of the wireless access interface.

The uplink transmission may comprise a 'message 3' (i.e., a message which may be the third message sent in a conventional random access procedure), such as the RRC Resume Request 556, transmitted at step S524 as described above.

The uplink transmission may be in accordance with further parameters configured prior to the suspension of the RRC connection. For example, the communications device 104 may receive, while the RRC connection is active, or as part of the suspension of the RRC connection, an indication of allocated communications resources, from which the communications resources for the uplink transmission may be selected.

In some embodiments, the allocated communications resources comprise a configured grant (CG) or 'grant free' resources. CG or grant free resources are a set of periodically repeating uplink communications resources which are semi-statically configured by the network for the use of the communications device for uplink transmission.

Preferably, the allocated communications resources are periodic having a periodicity such that the transmission of the uplink message using the allocated communications resources may occur before the transmission of the 'message 3' of a conventional random access procedure comprising a random access transmission on the PRACH. For example, in some embodiments, the periodicity of the allocated communications resources (i.e. the time duration between consecutive instances of the allocated communications resources) is lower than a time duration between the reception of a paging message and an earliest opportunity for a subsequent transmission of a 'message 3'.

It will be appreciated that in some embodiments, steps and features described herein may be combined in ways other than described above. In some embodiments, steps and features may be combined with or replace those of conventional techniques.

Thus there has been described a method of operating an infrastructure equipment of a wireless communications network, the method comprising transmitting control information via a wireless access interface provided by the wireless communications network to a communications device to configure the communications device to receive paging messages as part of a group of one or more communications devices, the communications device being configured by the control information from a first state in which the communications device monitors a pattern of paging frames of the wireless access interface for receiving paging messages determined by the communications device to a second state in which the communications device is configured to monitor the same pattern of paging frames of the wireless access interface for receiving paging messages as the group of one or more communications devices.

There has also been described communications devices and methods.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating an infrastructure equipment of a wireless communications network, the method comprising: transmitting control information via a wireless access interface provided by the wireless communications network to a communications device to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor the same second pattern of paging frames of the wireless access interface for receiving paging messages as the group of one or more communications devices.

Paragraph 2. A method according to paragraph 1, the method comprising selecting the group of one or more communications devices from a plurality of communications devices in accordance with predetermined criteria.

Paragraph 3. A method according to paragraph 2, wherein the predetermined criteria comprise one or more of criteria based on a location of the communications devices, criteria based on a subscription associated with the communications, and criteria based on a quality of service required for data transmission to the communications device Paragraph 4. A method according to paragraph 3, wherein criteria based on a location of the communications device are determined based on one or more of detection by the communications device of an indoor beacon, a device-to-device proximity detection with respect to another communications devices, and radio resource management measurements.

Paragraph 5. A method according to any of paragraphs 1 to 4, the method comprising determining that data is to be transmitted to each of the one or more communications devices of the group and that each of the one or more communications devices has a respective radio resource control (RRC) connection which is suspended, in response to the determining, transmitting within a paging frame of the second pattern of paging frames a paging message indicating that the infrastructure equipment has data to be transmitted to each of the group of one or more communications devices; and transmitting the data to each of the group of one or more communications devices.

Paragraph 6. A method according to paragraph 5, wherein the data transmitted to each of the group of one or more communications devices is the same.

Paragraph 7. A method according to any of paragraphs 1 to 6, wherein the control information transmitted to the communications device to receive paging messages as part of the group of one or more communications devices comprises an indication of an assigned temporary identifier, the temporary identifier being assigned to each of the group of communications devices being associated with the second pattern of paging frames.

Paragraph 8. A method according to any of paragraphs 1 to 6, the method comprising transmitting to each of the group of one or more communications devices an indication of an assigned temporary identifier, wherein the control information transmitted to the communications device to receive paging messages as part of the group of one or more communications devices comprises an indication that the communications device is to determine the second pattern of paging frames without regards to the assigned temporary identifier.

Paragraph 9. A method according to paragraph 8, wherein the indication that the communications device is to determine the second pattern of paging frames without regards to the assigned temporary identifier comprises an indication that the communications device is to determine the second pattern of paging frames in accordance with a predetermined algorithm for determining a pattern of paging frames based on the assigned temporary identifier by substituting a first value for the assigned temporary identifier in the algorithm.

Paragraph 10. A method according to paragraph 9, wherein the first value is zero or a constant.

Paragraph 11. A method according to paragraph 9 or paragraph 10, wherein the control information comprises an indication of the first value.

Paragraph 12. A method according to any of paragraphs 7 to 11, wherein the temporary identifier is a temporary mobile subscriber identity for uniquely identifying the communications device within at least a portion of the wireless communication network.

Paragraph 13. A method according to any of paragraphs 1 to 6, wherein the control information comprises an indication that the communications device is to determine the second pattern of paging frames in accordance with a parameter associated with a group of communications devices sharing the same pattern of paging frames, the second pattern of paging frames corresponding to a pattern of paging frames monitored in accordance with an algorithm for determining a pattern of paging frames by communications devices not in the group of one or more communications devices.

Paragraph 14. A method according to any of paragraphs 1 to 13, wherein the control information is transmitted in a broadcast message.

Paragraph 15. A method according to any of paragraphs 1 to 13, wherein the control information is transmitted in an RRC message indicating that an RRC connection is suspended or released.

Paragraph 16. A method of operating an infrastructure equipment of a wireless communications network, the method comprising: selecting a group of two or more communications devices, determining that data is to be transmitted to each of a group of two or more communications devices and that each of the group of two or more communications devices has a respective radio resource control (RRC) connection which is suspended or is in an idle state, and in response to the determining, selecting a first communications device of the group of two or more communications devices, transmitting within a paging frame monitored by the first communications device a paging message indicating that the infrastructure equipment has data to be transmitted to each of the group of one or more communications devices, the paging frame not being monitored by at least one other of the group of two or more communications devices; and transmitting the data to each of the group of two or more communications devices without transmitting a paging message to the others of the group of two or more communications devices.

Paragraph 17. A method according to paragraph 16, wherein the transmitting the data is in response to receiving a random access request from the first communications device.

Paragraph 18. A method according to paragraph 16 or paragraph 17, wherein the transmitting the data to each of the group of two or more communications devices comprising transmitting the data using communications resources of the wireless access interface in accordance with a predetermined allocation of periodic communications resources.

Paragraph 19. A method of operating an infrastructure equipment of a wireless communications network, the method comprising: transmitting a random access permission indication indicating that a communications device is not permitted to transmit on a random access channel a response to a paging message transmitted by the infrastructure equipment.

Paragraph 20. A method according to paragraph 19, the method comprising: configuring for each of a group of two or more communications devices including the communications device a same pattern of paging frames for receiving paging messages.

Paragraph 21. A method according to paragraph 20, wherein the random access permission indicator indicates that the communications device is not permitted to transmit on a random access channel a response to a paging message transmitted by the infrastructure equipment if the paging message indicates that the infrastructure equipment has downlink data to transmit to the group of two or more communications devices.

Paragraph 22. A method according to any of paragraphs 19 to 21, the method comprising determining that data is to be transmitted to each of the group of two or more communications devices and that each of the group of two or more communications devices has a respective radio resource control (RRC) connection which is suspended or released, in response to the determining, transmitting in accordance with the pattern of paging frames a paging message indicating that the infrastructure equipment has downlink data to transmit to the group of two or more communications devices, receiving a random access message transmitted on a random access channel by a communications device of the group of two or more communications devices in response to the paging message, in response to receiving the random access message, determining that each of the RRC connections associated with the group of two or more communications devices is no longer suspended, and transmitting the data to each of the group of two or more communications devices.

Paragraph 23. A method according to any of paragraphs 20 to 22, the method comprising receiving a resume request message transmitted by a communications device of the group of two or more communications devices on an uplink shared channel using a timing advance determined prior to a suspension of the RRC connection of the communications device, the resume request message requesting that the RRC connection of the communications device be resumed.

Paragraph 24. A method according to paragraph 23, the method comprising transmitting to the communications device an indication of periodic allocated communications resources, wherein the resume request message is transmitted using the allocated communications resources.

Paragraph 25. A method of operating an infrastructure equipment of a wireless communications network, the method comprising transmitting to each of one or more communications devices control information, the control information indicating comprising one or more of: an indication that the communications device shall perform a random access procedure comprising a transmission of a random access request in response to receiving a paging message; an indication that the communications device is not permitted to transmit a random access response in response to a paging message; an indication that the communications device shall enter an RRC connected state directly in response to receiving a paging message; an indication that the communications device shall, in response to receiving a paging message, transmit a request for resumption or establishment of an RRC connection without first transmitting a random access request; and an indication of periodic communications resources for transmitting a request for resumption or establishment of an RRC connection.

Paragraph 26. A method according to paragraph 25, the method comprising: transmitting control information via a wireless access interface provided by the wireless communications network to each of one or more communications devices to configure the communications devices to receive paging messages as part of a group of one or more communications devices, the communications devices being configured by the control information from a first state in which each communications device monitors a first pattern of paging frames of the wireless access interface for receiving paging messages determined by the communications device to a second state in which each communications device is configured to monitor the same second pattern of paging frames of the wireless access interface for receiving paging messages as the group of one or more communications devices.

Paragraph 27. A method of operating a communications device in a wireless communications network comprising an infrastructure equipment, the method comprising: establishing an RRC connection, and receiving control information via a wireless access interface provided by the wireless communications network to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor the same second pattern of paging frames of the wireless access interface for receiving paging messages as the group of one or more communications devices.

Paragraph 28. A method according to paragraph 27, the method comprising suspending the RRC connection, while the RRC connection is suspended, receiving within one of the second pattern of paging frames a paging message, the paging message indicating that the infrastructure equipment has data to be transmitted to each of the group of one or more communications devices; and receiving the data.

Paragraph 29. A method according to paragraph 28, wherein suspending the RRC connection comprises receiving the control information.

Paragraph 30. A method according to paragraph 28, wherein the control information is transmitted in a broadcast message.

Paragraph 31. A method according to any of paragraphs 27 to 30, the method comprising receiving an indication of an assigned temporary identifier, wherein the control information comprises an indication that the communications device is to determine the second pattern of paging frames without regards to the assigned temporary identifier.

Paragraph 32. A method according to any of paragraphs 27 to 30, the method comprising receiving an indication of an assigned temporary identifier, wherein the control information comprises an indication that the communications device is to determine the second pattern of paging frames in accordance with a predetermined algorithm for determining a pattern of paging frames based on the assigned temporary identifier by substituting a first value for the assigned temporary identifier in the algorithm.

Paragraph 33. A method according to paragraph 32, wherein the first value is zero or a constant.

Paragraph 34. A method according to paragraph 32 or paragraph 33, wherein the control information comprises an indication of the first value.

Paragraph 35. A method according to any of paragraphs 29 to 34, wherein the temporary identifier is a temporary mobile subscriber identity for uniquely identifying the communications device within at least a portion of the wireless communication network.

Paragraph 36. A method of operating a communications device in a wireless communications network, the method comprising: establishing an RRC connection, suspending the RRC connection, receiving a paging message indicating that the infrastructure equipment has data is to be transmitted to each of a group of two or more communications devices including the communications device, in response to receiving the paging message, transmitting a wake-up trigger indication in accordance with a predetermined schedule for the transmission of the wake-up trigger indication, the wake-up trigger indication for indicating to another communications device of the group of two or more communications devices that the infrastructure equipment has data to be transmitted to the group of two or more communications devices, and receiving the data.

Paragraph 37. A method of operating a communications device in a wireless communications network comprising an infrastructure equipment, the method comprising: establishing an RRC connection, suspending the RRC connection, monitoring for a wake-up trigger indication in accordance with a predetermined schedule, receiving the wake-up trigger indication, the wake-up trigger indication indicating to the communications device that the infrastructure equipment has data to be transmitted to a group of two or more communications devices and transmitted by another communications device of the group of two or more communications devices in response to receiving a paging message indicating that the infrastructure equipment has data is to be transmitted to each of the group of two or more communications devices, and receiving the data.

Paragraph 38. A method of operating a communications device in a wireless communications network, the wireless communications network comprising an infrastructure equipment, the method comprising: receiving a random access permission indication indicating that the communications device is not permitted to transmit on a random access channel a response to a paging message transmitted by the infrastructure equipment.

Paragraph 39. A method according to paragraph 38, wherein the random access permission indicator indicates that the communications device is not permitted to transmit on a random access channel a response to a paging message transmitted by the infrastructure equipment if the paging message indicates that the infrastructure equipment has downlink data to transmit to a group of two or more communications devices including the communications device.

Paragraph 40. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit control information via a wireless access interface provided by the wireless communications network to the communications device to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor the same second pattern of paging frames of the wireless access interface for receiving paging messages as the group of one or more communications devices.

Paragraph 41. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit control information via a wireless access interface provided by the wireless communications network to the communications device to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor the same second pattern of paging frames of the wireless access interface for receiving paging messages as the group of one or more communications devices.

Paragraph 42. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to select a group of two or more communications devices, to determine that data is to be transmitted to each of a group of two or more communications devices and that each of the group of two or more communications devices has a respective radio resource control (RRC) connection which is suspended or is in an idle state, and in response to the determining, to select a first communications device of the group of two or more communications devices, to transmit within a paging frame monitored by the first communications device a paging message indicating that the infrastructure equipment has data to be transmitted to each of the group of one or more communications devices, the paging frame not being monitored by at least one other of the group of two or more communications devices; and to transmit the data to each of the group of two or more communications devices without transmitting a paging message to the others of the group of two or more communications devices.

Paragraph 43. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to select a group of two or more communications devices, to determine that data is to be transmitted to each of a group of two or more communications devices and that each of the group of two or more communications devices has a respective radio resource control (RRC) connection which is suspended or is in an idle state, and in response to the determining, to select a first communications device of the group of two or more communications devices, to transmit within a paging frame monitored by the first communications device a paging message indicating that the infrastructure equipment has data to be transmitted to each of the group of one or more communications devices, the paging frame not being monitored by at least one other of the group of two or more communications devices; and to transmit the data to each of the group of two or more communications devices without transmitting a paging message to the others of the group of two or more communications devices.

Paragraph 44. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit a random access permission indication indicating that the communications device is not permitted to transmit on a random access channel a response to a paging message transmitted by the infrastructure equipment.

Paragraph 45. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit a random access permission indication indicating that the communications device is not permitted to transmit on a random access channel a response to a paging message transmitted by the infrastructure equipment.

Paragraph 46. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit to each of one or more communications devices control information, the control information indicating comprising one or more of: an indication that the communications device shall perform a random access procedure comprising a transmission of a random access request in response to receiving a paging message; an indication that the communications device is not permitted to transmit a random access response in response to a paging message; an indication that the communications device shall enter an RRC connected state directly in response to receiving a paging message; an indication that the communications device shall, in response to receiving a paging message, transmit a request for resumption or establishment of an RRC connection without first transmitting a random access request; and an indication of periodic communications resources for transmitting a request for resumption or establishment of an RRC connection.

Paragraph 47. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit to each of one or more communications devices control information, the control information indicating comprising one or more of: an indication that the communications device shall perform a random access procedure comprising a transmission of a random access request in response to receiving a paging message; an indication that the communications device is not permitted to transmit a random access response in response to a paging message; an indication that the communications device shall enter an RRC connected state directly in response to receiving a paging message; an indication that the communications device shall, in response to receiving a paging message, transmit a request for resumption or establishment of an RRC connection without first transmitting a random access request; and an indication of periodic communications resources for transmitting a request for resumption or establishment of an RRC connection.

Paragraph 48. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to establish an RRC connection, and to receive control information via a wireless access interface provided by the wireless access network to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor the same second pattern of paging frames of the wireless access interface for receiving paging messages as the group of one or more communications devices.

Paragraph 49. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to establish an RRC connection, and to receive control information via a wireless access interface provided by the wireless communications network to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor the same second pattern of paging frames of the wireless access interface for receiving paging messages as the group of one or more communications devices.

Paragraph 50. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to establish an RRC connection, to suspend the RRC connection, to receive a paging message indicating that the infrastructure equipment has data is to be transmitted to each of a group of two or more communications devices including the communications device, in response to receiving the paging message, to transmit a wake-up trigger indication in accordance with a predetermined schedule for the transmission of the wake-up trigger indication, the wake-up trigger indication for indicating to another communications device of the group of two or more communications devices that the infrastructure equipment has data to be transmitted to the group of two or more communications devices, and to receive the data.

Paragraph 51. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to establish an RRC connection, to suspend the RRC connection, to receive a paging message indicating that the infrastructure equipment has data is to be transmitted to each of a group of two or more communications devices including the communications device, in response to receiving the paging message, to transmit a wake-up trigger indication in accordance with a predetermined schedule for the transmission of the wake-up trigger indication, the wake-up trigger indication for indicating to another communications device of the group of two or more communications devices that the infrastructure equipment has data to be transmitted to the group of two or more communications devices, and to receive the data.

Paragraph 52. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to establish an RRC connection, to suspend the RRC connection, to monitor for a wake-up trigger indication in accordance with a predetermined schedule, to receive the wake-up trigger indication, the wake-up trigger indication indicating to the communications device that the infrastructure equipment has data to be transmitted to a group of two or more communications devices and transmitted by another communications device of the group of two or more communications devices in response to receiving a paging message indicating that the infrastructure equipment has data is to be transmitted to each of the group of two or more communications devices, and to receive the data.

Paragraph 53. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to establish an RRC connection, to suspend the RRC connection, to monitor for a wake-up trigger indication in accordance with a predetermined schedule, to receive the wake-up trigger indication, the wake-up trigger indication indicating to the communications device that the infrastructure equipment has data to be transmitted to a group of two or more communications devices and transmitted by another communications device of the group of two or more communications devices in response to receiving a paging message indicating that the infrastructure equipment has data is to be transmitted to each of the group of two or more communications devices, and to receive the data.

Paragraph 54. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to receive a random access permission indication indicating that the communications device is not permitted to transmit on a random access channel a response to a paging message transmitted by the infrastructure equipment.

Paragraph 55. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive a random access permission indication indicating that the communications device is not permitted to transmit on a random access channel a response to a paging message transmitted by the infrastructure equipment.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] Holma H. and Toskala A, "LTE for UMTS OFDMA and SC-FDMA based radio access", John Wiley and Sons, 2009
[3] 3GPP TS 38.304
[4] 3GPP TS 38.300
[5] GB patent GB 2509071

What is claimed is:

1. A method of operating an infrastructure equipment of a wireless communications network, the method comprising:

transmitting control information via a wireless access interface provided by the wireless communications network to a communications device to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor a same second pattern of paging frames of the wireless access interface for receiving paging messages as the group of one or more communications devices;

determining that data is to be transmitted to each of the one or more communications devices of the group and that each of the one or more communications devices has a respective radio resource control (RRC) connection which is suspended, in response to the determining, transmitting within a paging frame of the second pattern of paging frames a paging message indicating that the infrastructure equipment has data to be transmitted to each of the group of one or more communications devices; and transmitting the data to each of the group of one or more communications devices.

2. The method according to claim 1, further comprising selecting the group of one or more communications devices from a plurality of communications devices in accordance with predetermined criteria.

3. The method according to claim 2, wherein the predetermined criteria includes one or more of criteria based on a location of the communications devices, criteria based on a subscription, and criteria based on a quality of service required for data transmission to the communications device.

4. The method according to claim 3, wherein the criteria based on the location of the communications device are determined based on one or more of detection by the communications device of an indoor beacon, a device-to-device proximity detection with respect to another communications device, and radio resource management measurements.

5. The method according to claim 1, wherein the data transmitted to each of the group of one or more communications devices is the same.

6. The method according to claim 1, wherein the control information transmitted to the communications device to receive the paging messages as part of the group of one or more communications devices comprises an indication of an assigned temporary identifier, the temporary identifier being assigned to each of the group of communications devices being associated with the second pattern of paging frames.

7. The method according to claim 6, wherein the temporary identifier is a temporary mobile subscriber identity for uniquely identifying the communications device within at least a portion of the wireless communication network.

8. The method according to claim 1, the method comprising
transmitting to each of the group of one or more communications devices an indication of an assigned temporary identifier, wherein
the control information transmitted to the communications device to receive the paging messages as part of the group of one or more communications devices comprises an indication that the communications device is to determine the second pattern of paging frames without regards to the assigned temporary identifier.

9. The method according to claim 8, wherein the indication that the communications device is to determine the second pattern of paging frames without regards to the assigned temporary identifier comprises an indication that the communications device is to determine the second pattern of paging frames in accordance with a predetermined algorithm for determining a pattern of paging frames based on the assigned temporary identifier by substituting a first value for the assigned temporary identifier in the algorithm.

10. The method according to claim 9, wherein the first value is zero or a constant.

11. The method according to claim 9, wherein the control information comprises an indication of the first value.

12. The method according to claim 1, wherein the control information comprises an indication that the communications device is to determine the second pattern of paging frames in accordance with a parameter associated with a group of communications devices sharing a same pattern of paging frames, the second pattern of paging frames corresponding to a pattern of paging frames monitored in accordance with an algorithm for determining a pattern of paging frames by communications devices not in the group of one or more communications devices.

13. The method according to claim 1, wherein the control information is transmitted in a broadcast message.

14. The method according to claim 1, wherein the control information is transmitted in an RRC message indicating that an RRC connection is suspended or released.

15. A method of operating an infrastructure equipment of a wireless communications network, the method comprising:
transmitting control information via a wireless access interface provided by the wireless communications network to a communications device to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor a same second pattern of paging frames of the wireless access interface for receiving paging messages as the group of one or more communications devices; and
transmitting to each of the group of one or more communications devices an indication of an assigned temporary identifier, wherein
the control information transmitted to the communications device to receive the paging messages as part of the group of one or more communications devices comprises an indication that the communications device is to determine the second pattern of paging frames without regards to the assigned temporary identifier.

16. The method according to claim 15, wherein the indication that the communications device is to determine the second pattern of paging frames without regards to the assigned temporary identifier comprises an indication that the communications device is to determine the second pattern of paging frames in accordance with a predetermined algorithm for determining a pattern of paging frames based on the assigned temporary identifier by substituting a first value for the assigned temporary identifier in the algorithm.

17. The method according to claim 16, wherein the first value is zero or a constant.

18. The method according to claim 16, wherein the control information comprises an indication of the first value.

19. A method of operating an infrastructure equipment of a wireless communications network, the method comprising:
transmitting control information via a wireless access interface provided by the wireless communications network to a communications device to configure the communications device to receive paging messages as part of a group of one or more communications devices, the communications device being configured by the control information from a first state in which the communications device monitors a first pattern of paging frames of the wireless access interface for receiving paging messages determined by the communications device to a second state in which the communications device is configured to monitor a same second pattern of paging frames of the wireless access interface for receiving paging messages as the group of one or more communications devices,
wherein the control information comprises an indication that the communications device is to determine the second pattern of paging frames in accordance with a parameter associated with a group of communications devices sharing a same pattern of paging frames, the second pattern of paging frames corresponding to a pattern of paging frames monitored in accordance with an algorithm for determining a pattern of paging frames by communications devices not in the group of one or more communications devices.

* * * * *